US012701090B2

(12) United States Patent
Kuks et al.

(10) Patent No.: US 12,701,090 B2
(45) Date of Patent: Aug. 4, 2026

(54) SPECULATIVE EGRESS FORWARDING

(71) Applicant: MELLANOX TECHNOLOGIES, LTD., Yokneam (IL)

(72) Inventors: Sagi Kuks, Ramat Gan (IL); Ofir Klara Altshul, Herzliya (IL); Eyal Srebro, Kfar Yehoshua (IL); Idan Matari, Lod (IL); Elchanan Harshoshanim, Aley Zahav (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 430 days.

(21) Appl. No.: 18/128,776

(22) Filed: Mar. 30, 2023

(65) Prior Publication Data

US 2024/0333663 A1     Oct. 3, 2024

(51) Int. Cl.
| | |
|---|---|
| *H04L 12/879* | (2013.01) |
| *H03M 13/00* | (2006.01) |
| *H04L 12/43* | (2006.01) |
| *H04L 47/34* | (2022.01) |
| *H04L 49/00* | (2022.01) |
| *H04L 49/101* | (2022.01) |

(52) U.S. Cl.
CPC .......... *H04L 49/3027* (2013.01); *H04L 47/34* (2013.01); *H04L 49/101* (2013.01)

(58) Field of Classification Search
CPC ....... H04L 47/34; H04L 49/901; H04L 49/90; H04L 49/9094; H04L 1/0072; H04L 49/101; H04L 47/624; H04L 47/6225; H04L 1/0083; H04L 69/16; H04L 49/3027; H04L 1/0061; H03M 13/00; H03M 13/09; H03M 13/091

USPC .......................................................... 370/389
See application file for complete search history.

(56) References Cited

U.S. PATENT DOCUMENTS

| | | | | |
|---|---|---|---|---|
| 8,284,790 | B1 * | 10/2012 | Kommidi | ............ H04L 49/3018 370/416 |
| 10,462,075 | B2 * | 10/2019 | Gabbay | ............... H04L 49/9094 |
| 10,915,479 | B1 * | 2/2021 | Levi | ......................... G06F 13/28 |
| 11,102,129 | B2 * | 8/2021 | Burstein | ............... H04L 47/283 |

(Continued)

OTHER PUBLICATIONS

"Switching Hardware," CS 438 Staff, University of Illinois, 2015, 53 pages [retrieved online from: courses.engr.illinois.edu/cs438/sp2015/lectures/switch.pdf].

*Primary Examiner* — Edan Orgad
*Assistant Examiner* — Vanneilian Lalchinthang
(74) *Attorney, Agent, or Firm* — Sheridan Ross P.C.

(57) ABSTRACT

A switching device includes ingress ports, egress ports, and switching circuits that connect the ingress ports with the egress ports. The switching device segments data included in a packet received at an ingress port into a plurality of segments. The switching device transfers the plurality of segments to an egress port via a data path included in the switching circuits, according to a first mode of routing the packet in an absence of reading a descriptor corresponding to the packet. The switching device orders, using port logic associated with the egress port, the segments and provides sequence numbers associated with the ordered segments to port logic associated with the ingress port. The switching device validates the transfer of the plurality of segments according to the first mode based on verifying that the sequence numbers satisfy at least one criterion.

20 Claims, 8 Drawing Sheets

(56)        References Cited

U.S. PATENT DOCUMENTS

| 11,405,324 | B1 * | 8/2022 | Segal | H04L 1/08 |
|---|---|---|---|---|
| 2005/0129045 | A1 * | 6/2005 | Machulsky | H04L 1/08 |
| | | | | 370/428 |
| 2005/0149817 | A1 * | 7/2005 | Biran | H04L 1/0083 |
| | | | | 714/758 |
| 2005/0201400 | A1 * | 9/2005 | Park | H04L 47/624 |
| | | | | 370/412 |
| 2006/0114914 | A1 * | 6/2006 | Anand | H04L 49/90 |
| | | | | 370/392 |
| 2016/0149823 | A1 * | 5/2016 | Ko | H04L 49/352 |
| | | | | 709/223 |
| 2022/0191144 | A1 * | 6/2022 | Terstrup | H04L 45/74591 |

* cited by examiner

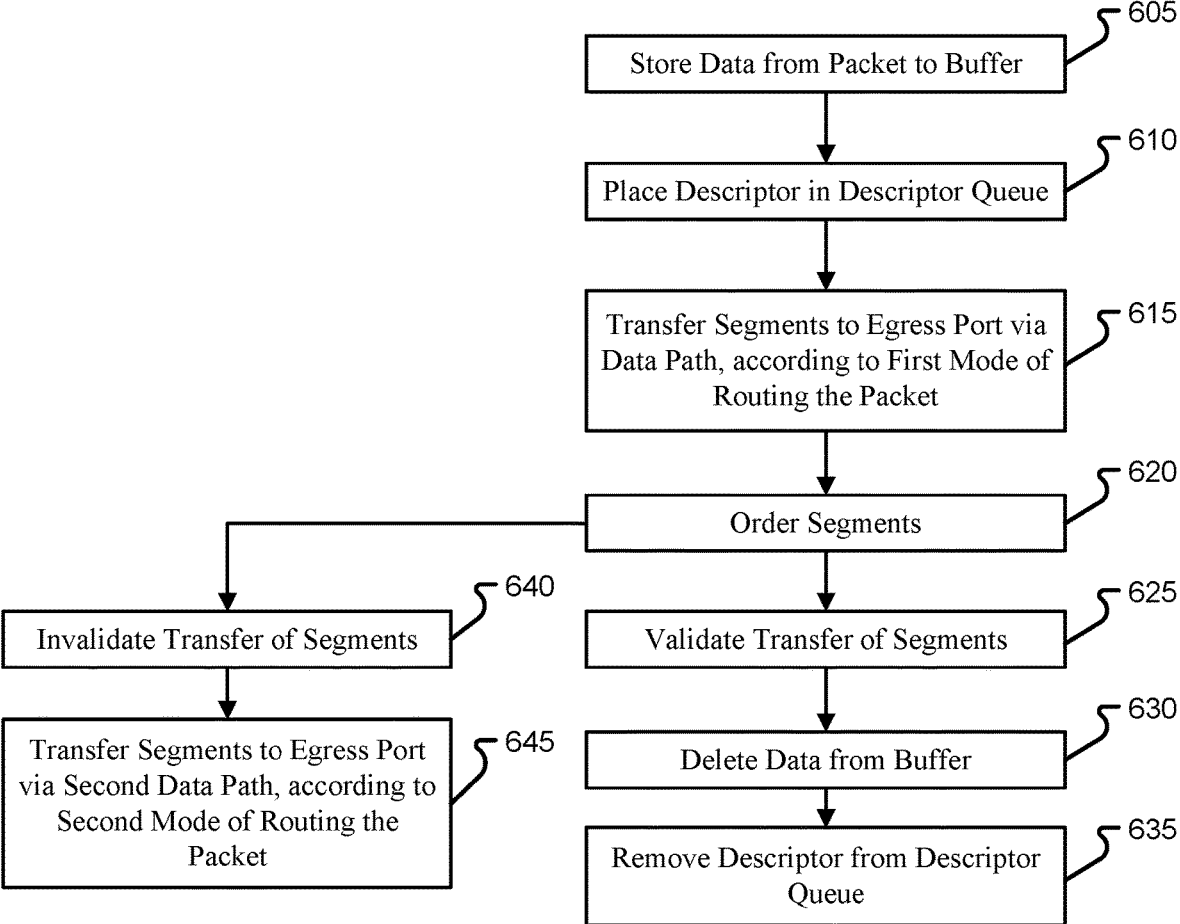

605 Store Data from Packet to Buffer

610 Place Descriptor in Descriptor Queue

615 Transfer Segments to Egress Port via Data Path, according to First Mode of Routing the Packet 620 Order Segments 640 Invalidate Transfer of Segments 625 Validate Transfer of Segments 645 Transfer Segments to Egress Port via Second Data Path, according to Second Mode of Routing the Packet 630 Delete Data from Buffer 635 Remove Descriptor from Descriptor Queue

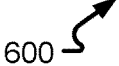

Segment Data Included in Packet ⌐703

Store Data from Packet to Buffer ⌐705

Place Descriptor in Descriptor Queue ⌐710

Transfer Segments to Egress Port via Data Path, according to First Mode of Routing the Packet ⌐715

Order Segments ⌐720

Invalidate Transfer of Segments ⌐740

Validate Transfer of Segments ⌐725

Transfer Segments to Egress Port via Second Data Path, according to Second Mode of Routing the Packet ⌐745

Delete Data from Buffer ⌐730

Remove Descriptor from Descriptor Queue ⌐735

700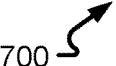

*Fig. 7*

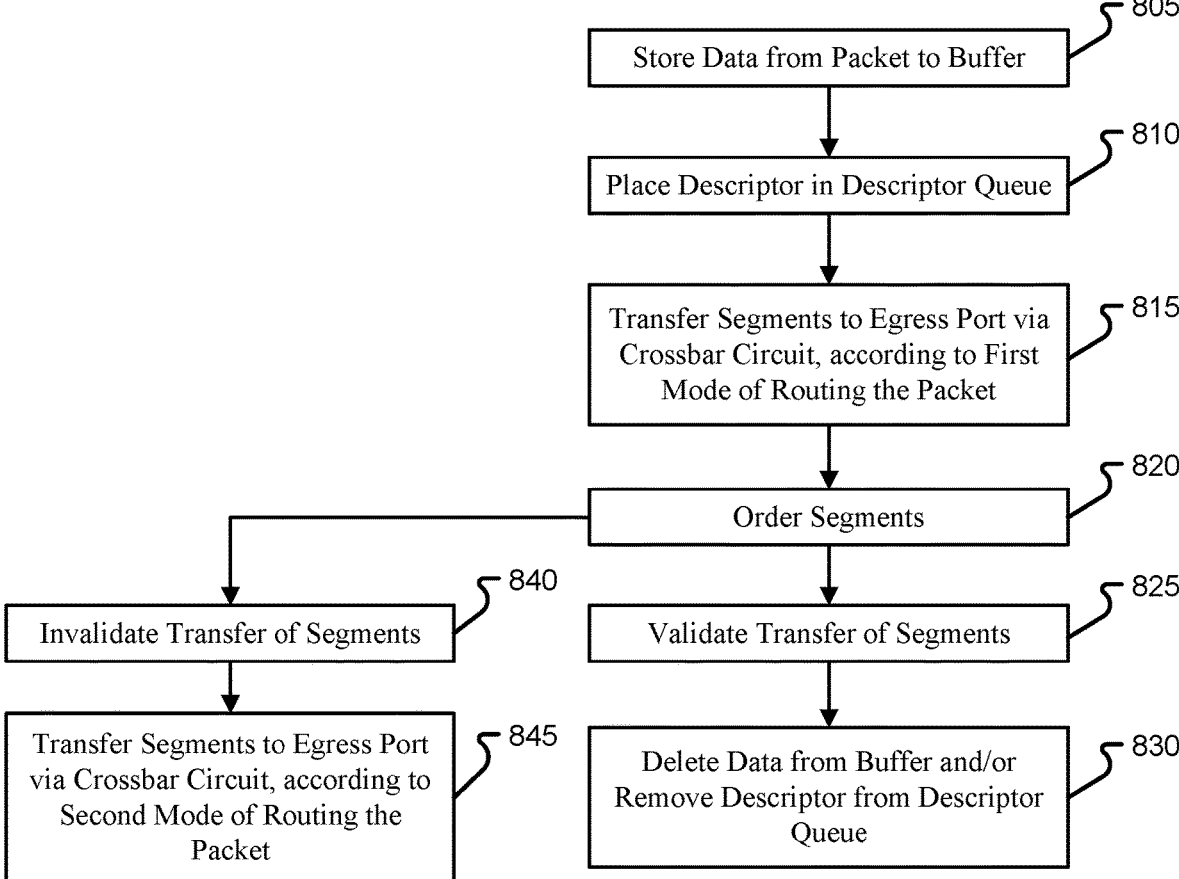

805

Store Data from Packet to Buffer

810

Place Descriptor in Descriptor Queue

815

Transfer Segments to Egress Port via Crossbar Circuit, according to First Mode of Routing the Packet

820

Order Segments

840

Invalidate Transfer of Segments

825

Validate Transfer of Segments

845

Transfer Segments to Egress Port via Crossbar Circuit, according to Second Mode of Routing the Packet

830

Delete Data from Buffer and/or Remove Descriptor from Descriptor Queue

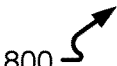

SPECULATIVE EGRESS FORWARDING

FIELD OF TECHNOLOGY

The present disclosure relates to data communications, and more particularly, to packet switching devices and packet switching techniques.

BACKGROUND

Packet switches are implemented in data networks. When a packet is received at a port of a packet switch, forwarding logic in the packet switch may process the packet header to determine the output port through which the packet should be transmitted. A crossbar circuit (also referred to herein as a switching core or crossbar switching logic) within the packet switch may transfer the packet to the output port. Improved packet switching techniques are desired which reduce the amount of latency in a packet switch, reducing the cumulative latency of data transfer across a network.

SUMMARY

The described techniques relate to improved methods, systems, devices, and apparatuses that support low-latency packet switching. The described techniques support speculative egress data forwarding in a packet switch to achieve low latency with fallback.

Examples may include one of the following features, or any combination thereof.

An apparatus including processing circuitry. In some aspects, the processing circuitry is to: transfer, from an ingress port, a plurality of segments associated with a packet to an egress port via a data path included in the apparatus, wherein transferring the plurality of segments is performed according to a first mode of routing the packet in an absence of reading a descriptor corresponding to the packet; order, at the egress port, the plurality of segments based on sequence numbers associated with the plurality of segments; and validate the transfer of the plurality of segments according to the first mode based on verifying that the sequence numbers satisfy at least one criterion.

In some aspects, the processing circuitry is to further: store data from the packet to a buffer; and delete the data from the buffer in response to validating the transfer of the plurality of segments in association with the first mode.

In some aspects, the processing circuitry is to further: place a descriptor corresponding to the packet in a descriptor queue; and remove the descriptor from the descriptor queue in response to validating the transfer of the plurality of segments in association with the first mode.

In some aspects, the plurality of segments are transferred to the egress port according to the first mode by bypassing a descriptor queue.

In some aspects, the processing circuitry is to further: invalidate the transfer of the plurality of segments according to the first mode based on determining that the sequence numbers fail to satisfy the at least one criterion; and transfer the plurality of segments to the egress port via a second data path included in the apparatus, according to a second mode of routing the packet, wherein the plurality of segments are transferred according to the second mode based on reading the descriptor from a descriptor queue.

In some aspects, the plurality of segments are transferred according to the second mode by reading the descriptor based on a queue position of the descriptor in the descriptor queue.

In some aspects, the apparatus further includes: a crossbar circuit that includes the data path, wherein the plurality of segments are transferred according to the first mode in response to receiving an indication of a congestion state of the crossbar circuit.

In some aspects, the apparatus further includes: one or more state machines, wherein the plurality of segments are transferred according to the first mode based on a state provided by the one or more state machines.

In some aspects, the processing circuitry is to further: determine a buffer usage of a data buffer, wherein the plurality of segments are transferred according to the first mode based on a result of comparing the buffer usage to a threshold buffer usage value.

In some aspects, the processing circuitry is to further transfer the plurality of segments to the egress port according to a second mode of routing the packet in response to: a failure associated with the transfer of the plurality of segments to the egress port according to the first mode; and confirmation of at least one second criterion. In some aspects, the at least one second criterion includes: a return of the sequence numbers to the ingress port; a target packet count associated with the egress port; or both.

A switching device including: a plurality of ingress ports; a plurality of egress ports; one or more switching circuits that connect the plurality of ingress ports with the plurality of egress ports; and processing circuitry. In some aspects, the processing circuitry is to: segment, using first port logic associated with an ingress port of the plurality of ingress ports, data included in a packet received at the ingress port into a plurality of segments; transfer the plurality of segments to an egress port of the plurality of egress ports via a data path included in the one or more switching circuits, wherein transferring the plurality of segments is performed according to a first mode of routing the packet in an absence of reading a descriptor corresponding to the packet; order, using second port logic associated with the egress port, the plurality of segments based on sequence numbers associated with the plurality of segments and provide the sequence numbers to the first port logic; and validate, using the first port logic, the transfer of the plurality of segments according to the first mode, wherein validating the transfer of the plurality of segments according to the first mode is based on the first port logic verifying that the sequence numbers satisfy at least one criterion.

In some aspects, the processing circuitry is to further: store data from the packet to a buffer; and delete the data from the buffer in response to the validation of the transfer of the plurality of segments according to the first mode.

In some aspects, the processing circuitry is to further: place the descriptor corresponding to the packet in a descriptor queue; and remove the descriptor from the descriptor queue in response to validating the transferring of the plurality of segments in association with the first mode.

In some aspects, the processing circuitry is to further: invalidate, using the first port logic, the transfer of the plurality of segments according to the first mode based on determining that the sequence numbers fail to satisfy the at least one criterion; and transfer the plurality of segments to the egress port via a second data path included in the one or more switching circuits, according to a second mode of routing the packet, wherein the plurality of segments are transferred according to the second mode based on reading the descriptor from a descriptor queue.

In some aspects, the plurality of segments are transferred according to the first mode in response to an indication of a congestion state of the one or more switching circuits.

In some aspects, the switching device further includes: one or more first state machines associated with the ingress port; and one or more second state machines associated with the egress port. In some aspects, the plurality of segments are transferred according to the first mode based on a state provided by the one or more first state machines, a state provided by the one or more second state machines, or both.

An apparatus including processing circuitry to: transfer, from an ingress port, a plurality of segments associated with a packet to an egress port via one or more crossbar circuits included in the apparatus, wherein transferring the plurality of segments is performed according to a first mode of routing the packet in an absence of reading a descriptor corresponding to the packet; order, at the egress port, the plurality of segments based on sequence numbers associated with the plurality of segments; and validate the transfer of the plurality of segments according to the first mode based on verifying that the sequence numbers satisfy at least one criterion.

In some aspects, the processing circuitry is to further: store data from the packet to a buffer; place the descriptor corresponding to the packet in a descriptor queue; and in response to validating the transfer of the plurality of segments in association with the first mode, at least one of: delete the data from the buffer; and remove the descriptor from the descriptor queue.

In some aspects, the processing circuitry is to further: invalidate the transfer of the plurality of segments according to the first mode based on determining that the sequence numbers fail to satisfy the at least one criterion; and transfer the plurality of segments to the egress port via the one or more crossbar circuits according to a second mode of routing the packet. In some aspects, the plurality of segments are transferred according to the second mode based on reading the descriptor from a descriptor queue.

BRIEF DESCRIPTION OF THE DRAWINGS

FIG. 6 illustrates an example of a process flow in accordance with aspects of the present disclosure.

FIG. 7 illustrates an example of a process flow in accordance with aspects of the present disclosure.

FIG. 8 illustrates an example of a process flow in accordance with aspects of the present disclosure.

DETAILED DESCRIPTION

Figure 1:
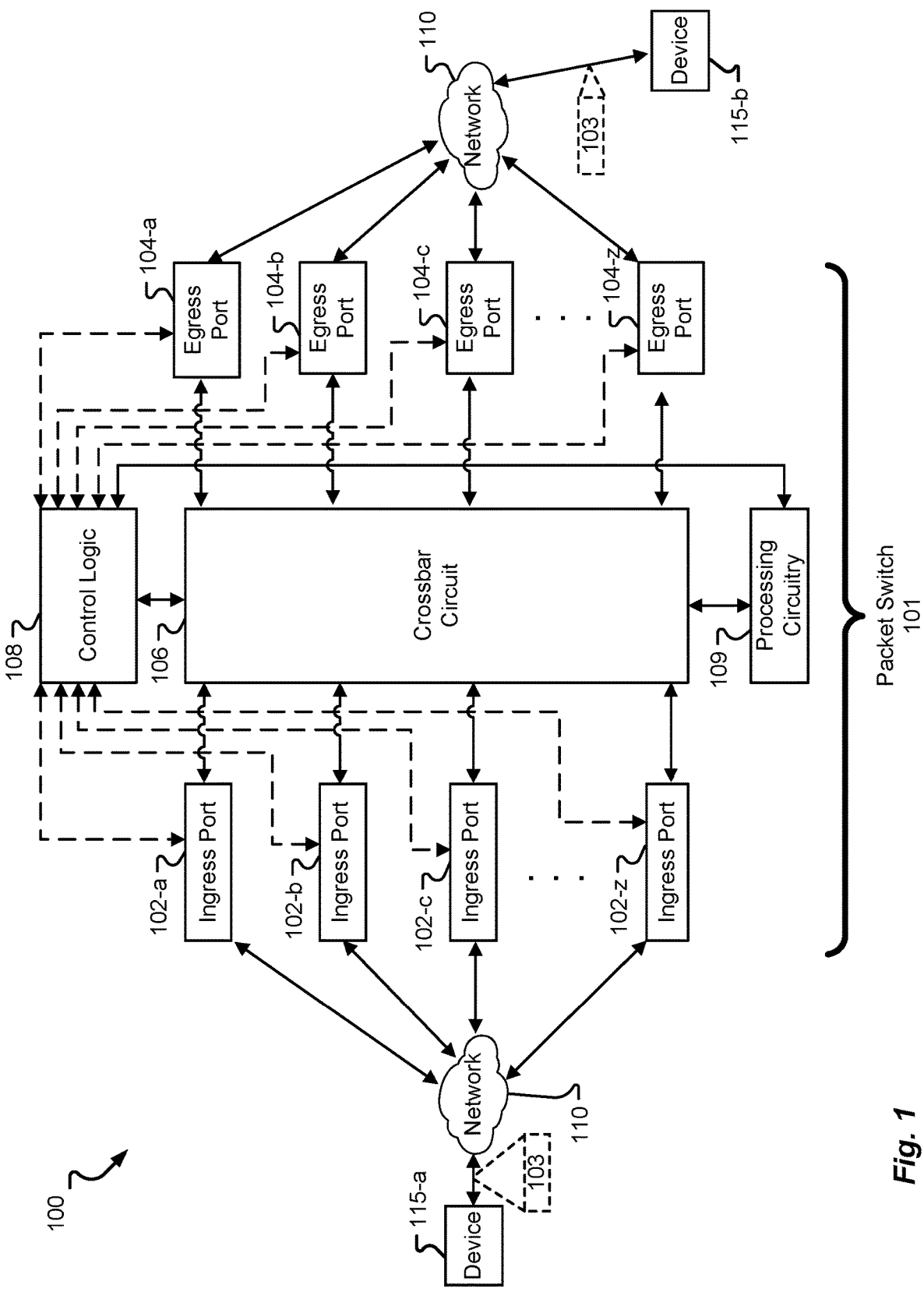
FIG. 1 illustrates an example of a system in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

In high-speed switches implemented in a data network, the header processing, forwarding computations, and packet queuing within the switch induce an amount of latency. The latency within the switch may add to the cumulative latency of data transfer across the data network. Some techniques use dedicated cross-bars for a low latency path within a switch, and the low latency path may have higher area cost compared to a non-low latency path. In some other techniques, a switch may utilize a deterministic approach for deciding whether to forward data packets via the low latency path or the regular path within the switch.

Aspects of the present disclosure support techniques which reduce the latency of a switch while minimizing or mitigating any increases in area of the switch (e.g., minimizing or mitigating any increases in circuitry associated with the techniques described herein for reducing the latency). The terms "switch" and "packet switch" may be used interchangeably herein.

According to example aspects of the present disclosure, for an incoming data packet at an ingress port of a switch, port logic at the ingress port may instruct the switching core to transfer/forward the packet via a low latency path to the appropriate egress port, bypassing a descriptor queue of the switching core. The low latency path may be an alternative, accelerated path through the switch, referred to herein for clarity as the "Turbo Path" (TP). All or at least a subset of the ports of the switch may be configured to support TP processing of incoming packets. Control logic in the switch may additionally place a descriptor corresponding to the packet in the descriptor queue and maintain a copy of the packet. In an example, the copy of the packet may be stored in a buffer space of the switch.

The port logic at the ingress port may determine whether transferring/forwarding the packet via the low latency path is successful based on one or more criteria. Example aspects of the criteria are later described herein. If the port logic determines the transferring/forwarding the packet via the low latency path is successful, the switch may delete the copy of the packet and remove the descriptor from descriptor queue.

If the port logic determines the transferring/forwarding the packet via the low latency path is unsuccessful, the switch may send the copy of the packet to the egress port via a non-low latency path (also referred to herein as a 'regular path'). In an example, transferring/forwarding the packet via the low latency path includes the descriptor being read from the descriptor queue. By preemptively transferring/forwarding the packet via the low latency path, the switch provides a non-deterministic and speculative approach for forwarding data packets via the low latency path.

In an example, the ingress port may divide an incoming packet into segments ('data chunks') and forward the segments to the egress port via the low latency path. The ingress port provides each segment a sequence number (e.g., allocates a sequence number to each segment) for reordering the data/segments of the packet. When the egress port receives the segments, the egress port will reorder the segments back into a packet according to the sequence numbers, and the egress port returns an indication of the sequence numbers to the ingress port. The transfer via the low latency path is successful if the sequence numbers provided by the egress port match the initial sequence numbers (e.g., no sequence numbers are missing). For example, a missing sequence number may indicate that a corresponding segment of the packet was not successfully received at the egress port.

An example implementation supported by aspects of the present disclosure is described herein. Each ingress port may implement one or more counters to maintain accounting of packets sent to egress ports (e.g., per port). In an example, the counters are used to assure packet ordering because the low latency path will bypass the regular path.

Using the counters, the packet switch may identify when utilizing the low latency path (e.g., bypassing the non-low latency path) may be possible. In some cases, even if the packet switch identifies from the counters that utilizing the low latency path for sending a packet to an egress port may be possible, using the low latency path may be unavailable due to available buffer credits associated with a remote device. In some aspects, the packet switch may include a data transmission queue (also referred to herein as 'TQ') used to organize the order of data transmission, and the packet switch may include a collision resolution queue (also referred to herein as 'RQ') used to resolve the collisions and to prevent collisions by new arrivals. In some cases, the RQ may not have the flow control information of the egress port (e.g., buffer credits on the remote device).

If the packet switch determines that using the low latency path is possible, the ingress port may send the data of a received packet to the egress port. In an example, port logic of the ingress port may allocate or assign a sequence number to each segment of the packet for reordering of the data. In some cases, the crossbar circuit of the packet switch does not maintain the ordering of the data (e.g., segments) when routing the data to the egress port.

In some aspects, the packet switch may send a stored copy of the packet via the non-low latency path (e.g., regular path) for cases in which sending the packet via the low latency path fails. In some example aspects, the low latency path is implemented using the same infrastructure as the non-low latency path.

When the egress port receives the segments of the packet via the low latency path, the egress port may reorder one or more of the segments and data included therein according to the sequence numbers (e.g., per resolution queue), assemble the segment(s) into a packet, send the packet to a port of a remote device based on one or more criteria (e.g., based on buffer credits at the remote device), and return the sequence numbers to the ingress port. The remote device may be a device in communication with the packet switch over a network.

In some aspects, aspects of the present disclosure support management of sequence numbers per port. For example, each ingress port may manage sequence numbers for segments of a packet, per egress port. In some cases, if forwarding of the packet to the remote device is not possible (e.g., due to a lack of buffer credits at the remote device), the egress port will drop the data received via the low latency path, and the egress port may forward the copy of the packet to the remote device once the copy arrives at the egress port via the non-low latency path.

In some example aspects, to avoid ordering issues, the packet switch may refrain from forwarding the copy of the packet via the non-low latency path until a decision is resolved. The decision may be based on any combination of example criteria described herein (e.g., sequence numbers returned to the ingress port, buffer credits available at the remote device, congestion at the crossbar circuit of the packet switch, etc.).

In some cases, if any data is dropped or low latency attempt is failed (e.g., at least a portion of the packet is not successfully received at the egress port), the packet switch may wait until all sequence numbers are returned to the resolution queue and until resolution queue packet counters are returned to zero, before initiating a new attempt to send a packet to the egress port. Accordingly, for example, by waiting until all sequence numbers are returned to the resolution queue and until the resolution queue packet counters are returned to zero, the packet switch may avoid ordering issues associated with the packet and other packets routed via the crossbar circuit.

Aspects of the present disclosure provide technical differences compared to other packet switching techniques. For example, some other packet switching techniques for low latency maintain an awareness of both egress and ingress entanglements for the low latency path at the decision point, in which a packet switch routes a packet from an ingress port to an egress port via a low latency path if success is promised. In contrast, aspects of the techniques described herein include speculative sending of a packet via the low latency path and a fallback option (e.g., keeping a reserve copy of the packet for sending via the non-low latency path). The speculative sending and the fallback option support features in which the egress port may drop a packet received via the low latency path, for example, based on cases described herein (e.g., cases in which routing of the packet to the egress port is unsuccessful, cases in which buffer credits are unavailable at the remote device, etc.). Aspects of the packet switch described herein include an egress enable for forwarding.

Aspects of the disclosure are further illustrated by and described with reference to apparatus diagrams, system diagrams, and flowcharts that relate to speculative egress data forwarding in switch to achieve low latency with fallback.

FIG. 1 illustrates an example of a system 100 supported by aspects of the present disclosure. The system 100 may include a packet switch 101. The packet switch 101 may include ingress ports 102 (e.g., ingress port 102-a through ingress port 102-z), a crossbar circuit 106, and egress ports 104 (e.g., egress port 104-a through egress port 104-z). The packet switch 101 and/or crossbar circuit 106 may include control logic 108 (also referred to herein as 'switching logic') for setting up transfer paths for communicating packets 103 (e.g., packet data) between devices 115 coupled to a network 110. For example, the packet switch 101 may communicate packets between a device 115-a and a device 115-b connected to network 110.

The packet switch 101 may include multiple ports (e.g., ingress ports 102, egress port 104, etc.) which are connected to network 110. In an example, for the sake of visual simplicity, network 110 is illustrated as two separate clouds in FIG. 1, on different sides of the packet switch 101. Packet switch 101 may be connected in substantially any sort of network topology, including various sorts of switch fabrics and extended networks that include multiple sub-networks.) Each port (e.g., ingress port 102, egress port 104) may serve as both an ingress port, receiving inbound packets (e.g., a packet 103) from the network 110, and an egress port, transmitting outbound packets (e.g., a packet 103) to the network 110. Packet switch 101 may include any quantity of the ports described herein.

The crossbar circuit 106 (also referred to herein as a crossbar switch core) may transfer data packets between respective ingress ports 102 and egress ports 104. For example, control logic 108 may control the operation of crossbar circuit 106 to transfer each received packet (e.g., packet 103) in turn to the appropriate egress port 104. The crossbar circuit 106 may include a switch fabric and may selectively connect the ingress ports 102 with the egress ports 104 according to at least destination addresses of received network packets (e.g., packets 103) and perform queuing functions. Upon receiving an incoming packet (e.g., packet 103) from the network 110, the ingress port 102 queues the packet and signals the control logic 108.

Control logic 108 may process the signals from the ingress port 102 (and/or other ingress ports 102) in order to decide which packets to switch, to decide in what order to switch or transfer the packets, and to control crossbar circuit 106 accordingly. In some aspects, the control logic 108 may perform one or more of the following functions: execute routing protocols, maintain forwarding tables (e.g., forwarding tables 131 later described herein), and monitor queues of the egress ports 104.

Packet switch 101 may include processing circuitry 109. Processing circuitry 109 may perform one or more functions of the packet switch 101 described herein. In some non-limiting examples, the processing circuitry 109 may perform at least one or more of the following functions: data-link-layer functions, forwarding table lookup, and forwarding of network packets (e.g., packets 103) to the crossbar circuit 106 (and switch fabric).

It is to be understood that the ingress ports 102, the crossbar circuit 106, egress ports 104, control logic 108, and processing circuitry 109 may be electrically coupled for example, via a communication bus or system bus of the packet switch 101. For simplicity, connections between the processing circuitry 109, the ingress ports 102, and the egress ports 104 are not illustrated. Example functions of the ingress ports 102, egress ports 104, control logic 108, and processing circuitry 109 are explained in greater detail herein.

Packet switch 101 may be configured to preemptively treat a packet flow as a Turbo Path (TP) flow. For example, for an incoming data packet (e.g., packet 103) reaching ingress port 102-*a*, port logic at the ingress port 102-*a* may queue the data packet for TP transfer via a path through crossbar circuit 106. The port logic at the ingress port 102-*a* may convey a request to control logic 108 to instruct the crossbar circuit 106 (e.g., core logic of the crossbar circuit 106) to transfer the data packet immediately via the path to an egress port 104 (e.g., egress port 104-*a*). The egress port 104 may then transmit a corresponding outgoing packet (e.g., packet 103) to device 115-*b* via the network 110.

In an example implementation, for an incoming packet (e.g., packet 103), port logic at the ingress port 102-*a* of packet switch 101 may instruct the crossbar circuit 106 to transfer/forward the packet via a low latency path of the crossbar circuit 106 to an egress port 104, bypassing a descriptor queue of the crossbar circuit 106. Logic in the packet switch 101 may additionally place a descriptor corresponding to the packet in the descriptor queue and maintain a copy of the packet. If transferring/forwarding the packet via the low latency path is successful (examples of which are described herein), the packet switch 101 deletes the copy of the packet and removes the descriptor from the descriptor queue. If unsuccessful, the packet switch 101 sends the copy of the packet to the egress port 104 via a non-low latency path, which includes the descriptor being read from the descriptor queue. By preemptively transferring/forwarding the packet via the low latency path, the packet switch 101 provides a non-deterministic and speculative approach for forwarding data packets via the low latency path.

In an example, the ingress port 102 may divide an incoming packet into segments and forward the segments to the egress port 104 via the low latency path. The ingress port

102 provides each segment a sequence number for reordering the data of the packet. When the egress port 104 receives the segments, the egress port 104 will reassemble the packet (e.g., reorder the segments back into a packet according to the sequence numbers), and the egress port 104 returns an indication of the sequence numbers to the ingress port 102. The transfer via the low latency path is successful if the sequence numbers provided by the egress port 104 match the initial sequence numbers (e.g., no sequence numbers are missing).

The system 100 may support the communication of data packets between entities (e.g., communication devices, server(s), etc.) of the system 100, for example, via one or more packet switches 101 and communications network 110. Aspects of the communications network 110 may be implemented by any communications network capable of facilitating machine-to-machine communications between entities (e.g., any number of devices 115). In an example, the devices 115 may include computing devices, communication devices, servers, and the like. For example, the communications network 110 may include any type of known communication medium or collection of communication media and may use any type of protocols to transport messages, signals, and/or data between endpoints. In some aspects, the communications network 110 may include wired communications technologies, wireless communications technologies, or any combination thereof. In some examples, the communications network 110 may support non-secure communication channels and secure communication channels.

The Internet is an example of a network (e.g., a communications network 110) supported by the system 100, and the network may constitute an Internet Protocol (IP) network consisting of multiple computers, computing networks, and other devices located in multiple locations. Other examples of networks supported by the system 100 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VOIP) network, Ethernet, InfiniBand™, a cellular network, and any other type of packet-switched or circuit-switched network known in the art. In some cases, the system 100 may include any combination of networks or network types. In some aspects, the networks may include any combination of communication mediums such as coaxial cable, copper cable/wire, fiber-optic cable, or antennas for communicating data (e.g., transmitting/receiving data).

In some aspects, packet switch 101 is produced using one or more suitable integrated circuits that include high-speed digital logic and interfaces for connection to the network. Example aspects of the system 100 and the packet switch 101 are further described herein.

Figure 2:
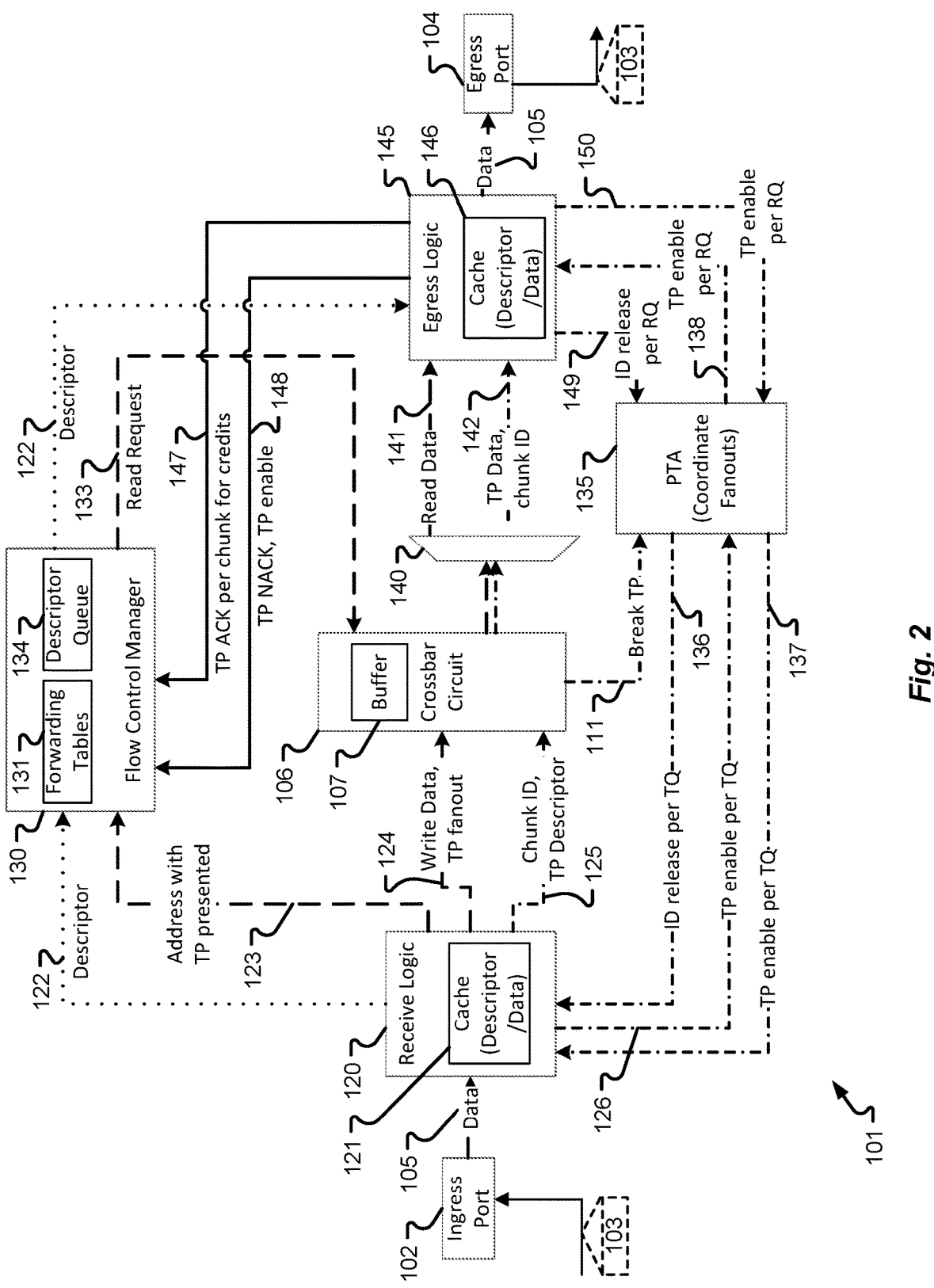
FIG. 2 illustrates an example of a packet switch in accordance with aspects of the present disclosure.

FIG. 2 illustrates an example of the packet switch 101 in accordance with aspects of the present disclosure. Example aspects of the packet switch 101 are described with reference to an ingress port 102 (e.g., ingress port 102-*a*, ingress port 102-*b*, etc.), the crossbar circuit 106, and an egress port 104 (e.g., egress port 104-*a*, egress port 104-*b*, etc.).

In the example of FIG. 2, the crossbar circuit 106 may include one or more buffers 107. The crossbar circuit 106 and buffer 107 may be referred to as 'BTA' herein. The packet switch 101 may include receive logic 120, a flow control manager 130, forwarding tables 131, a descriptor queue 134, PTA 135, a multiplexer circuit 140, and egress logic 145. In some non-limiting examples, one or more of the receive logic 120, flow control manager 130, forwarding tables 131, descriptor queue 134, PTA 135, multiplexer circuit 140, egress logic 145 and functions thereof may be implemented by components (e.g., crossbar circuit 106, control logic 108, processing circuitry 109, etc.) of the packet switch 101 as illustrated in FIG. 1. In an example, PTA 135 may be a crossbar circuit providing dedicated connection between egress logic 145 and receive logic 120 (e.g., between egress TP logic included in egress logic 145 and ingress TP logic included in receive logic 120) for returning IDs to the receive logic 120. In some aspects, PTA 135 may include a crossbar circuit and an arbiter component.

Example aspects of the packet switch 101 may support transfer of a packet 103 via a non-low latency path and a low latency path using a combination of signal(s) and/or data exchanged by components of the packet switch 101. For example, the packet switch 101 may establish and implement the transfer of a packet 103 via a non-low latency path and/or a low latency path using an example combination of signals and data including, but not limited to, a descriptor 122, a signal 123 ('address with TP presented'), a signal 124 ('Write Data, TP fanout'), a signal 125 ('Chunk ID, TP descriptor'), a signal 126 ('TP enable per TQ'), a signal 133 ('Read Request'), a signal 136 'ID release per TQ', a signal 137 ('TP enable per TQ'), a signal 138 ('TP enable per RQ'), data 141 ('Read Data'), data 142 ('TP data, chunk ID'), a signal 147 ('TP ACK per chunk for credits'), a signal 148 ('TP NACK, TP enable'), a signal 149 ('ID release per RQ'), and a signal 150 ('TP enable per RQ') described with reference to FIG. 2. In some example aspects, descriptor 122 and signal 123 may be associated with transfer of a packet 103 via a non-low latency path with indication of a low latency attempt. In some example aspects, signal 124 may be associated with transfer of a packet 103 for both a non-low latency path and a low latency path as described herein. For example, signal 124 may be transferred via a wire that fanouts to a buffer of the packet switch 101 for transfers via the non-low latency path and to the crossbar circuit 107 for transfers via the low latency path. In some example aspects, signal 125, signal 126, signal 136, signal 137, signal 138, signal 142, signal 149, and signal 150 may be associated with transfer of a packet 103 via a low latency path as described herein. In some other example aspects, signal 133 and signal 141 may be associated with transfer of a packet 103 via a non-low latency path as described herein.

For a packet 103 to be transferred from the ingress port 102 to an egress port 104 via a non-low latency path, the receive logic 120 may signal the crossbar circuit 106 with a descriptor 122 based on values in header fields of the packet 103 to indicate that the packet 103 is awaiting transfer. The flow control manager 130 may look up the header fields in a forwarding table 131 to determine forwarding information associated with the packet 103. In an example, the forwarding information may include the egress port 104 (e.g., any of egress port 104-a through egress port 104-z) to which the packet 103 is to be routed. In some cases, the forwarding information may include other egress parameters (e.g., virtual lane on which the packet 103 is to be transmitted). The flow control manager 130 may place the descriptor 122, with the forwarding information, in the descriptor queue 134.

The descriptor queue 134 may be organized, for example, as an array of linked lists, with each list corresponding to a particular egress port 104 (or a given virtual lane on the egress port 104). For a packet 103 to be transferred from the ingress port 102 to an egress port 104 via a low latency path, the crossbar circuit 106 may bypass reading of the descriptor 122 and bypass the descriptor queue 134. Additional example aspects associated with implementing the transfer of packets 103 via the non-low latency path or the low latency path are described herein.

In some aspects, the receive logic 120 is integrated with the ingress port 102. The receive logic 120 may support caching of descriptors/data of packets 103 received at the ingress port 102 for routing via the packet switch 101. In some aspects, the receive logic 120 may cache the descriptors/data in a cache 121 associated with the ingress port 102. Each ingress port 102 may include respective receive logic 120, and the cache 121 may be implemented in a buffer space associated with the ingress port 102. The terms "descriptor" and "packet descriptor" may be used interchangeably herein.

In some aspects, the egress logic 145 is integrated with the egress port 104. The egress logic 145 may support caching of descriptors/data described herein. For example, the egress logic 145 may cache the descriptors/data in a cache 146 associated with the egress port 104. In some aspects, the egress logic 145 may cache descriptors in association with receiving data via the non-low latency path, and the egress logic 145 may cache the data received based on the descriptors. In some other aspects, the egress logic 145 may cache segments (data chunks) received via the low latency path and assemble the segments into a packet 103. Each egress port 104 may include respective egress logic 145, and the cache 146 may be implemented in a buffer space associated with the egress port 104.

Example features of the packet switch 101 that support speculative egress data forwarding to achieve low latency with fallback are further described herein. It is to be understood that the features and components of the packet switch 101 described herein may be implemented by electronic circuitry of the packet switch 101.

Figure 3:
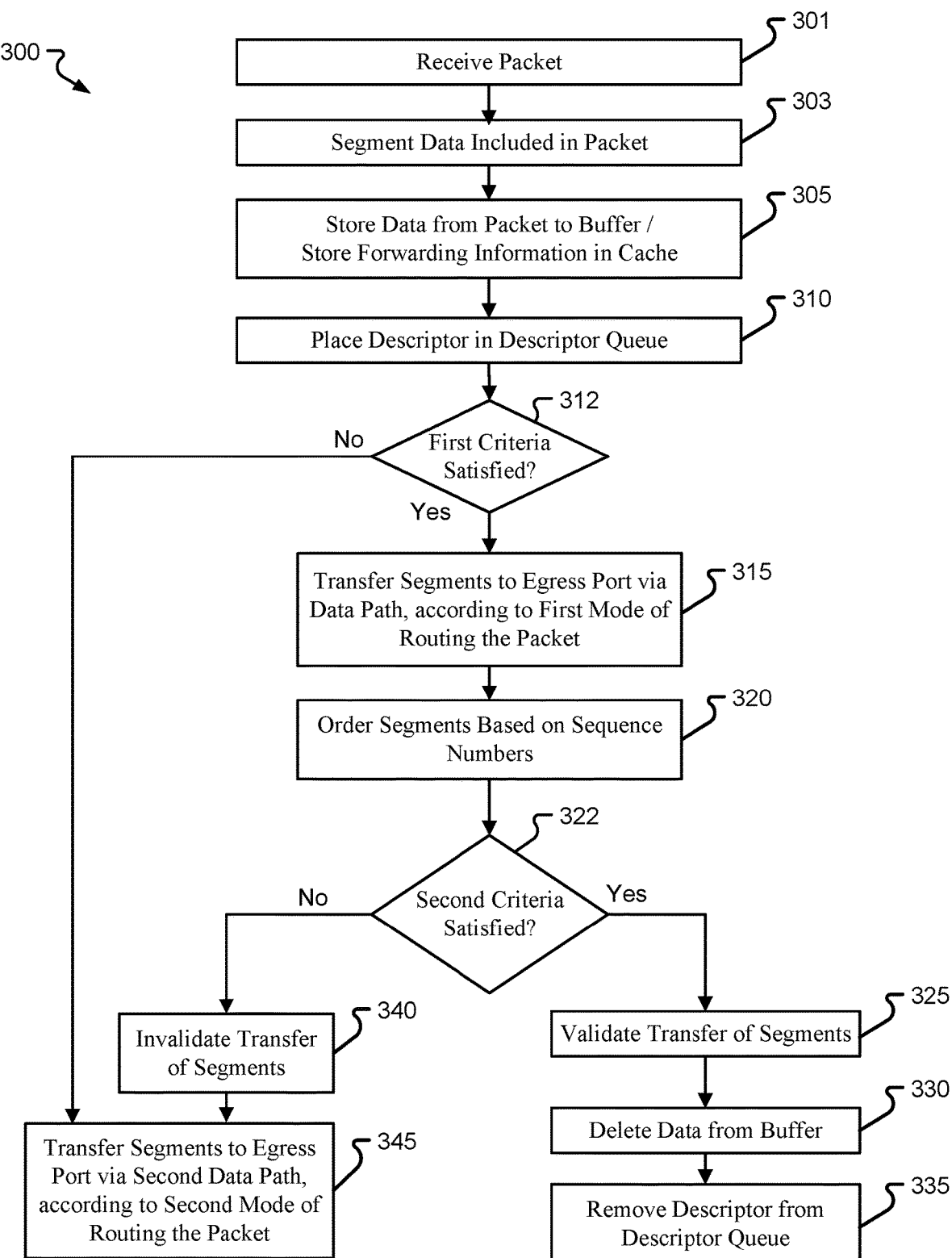
FIG. 3 illustrates an example of a process flow in accordance with aspects of the present disclosure.

FIG. 3 illustrates an example of a process flow 300 in accordance with aspects of the present disclosure. In some examples, process flow 300 may be implemented by aspects of a packet switch 101 described herein.

In the following description of the process flow 300, the operations may be performed in a different order than the order shown, or the operations may be performed in different orders or at different times. Certain operations may also be left out of the process flow 300, or other operations may be added to the process flow 300.

Example aspects of the process flow 300 are described with reference to the packet switch 101 and elements (e.g., data signals, logic, circuitry, components, etc.) therein illustrated in FIGS. 1 and 2.

At 301, the packet switch 101 may receive a packet 103 at the ingress port 102.

At 303, the process flow 300 may include segmenting, using receive logic 120, data 105 included in the packet 103 into segments (data chunks).

At 305, the process flow 300 may include storing the data 105 from the packet 103 to a packet buffer in the packet switch 101. For example, the packet buffer stores packet payload. In some examples, at 305, the process flow 300 may include storing forwarding information associated with the packet payload in cache 121 (e.g., to decrease latency associated with looking for the forwarding information in forwarding tables). In an example, the data 105 may include the segments described with reference to 303. Accordingly, for example, 305 of the process flow includes storing a copy of the packet 103 in the packet buffer.

In some aspects, in response to receiving an incoming packet 103, the receive logic 120 may perform physical and logical layer processing before placing the packet 103 in the packet buffer to await forwarding by the crossbar circuit 106. The buffering function associated with the packet buffer may be allocated to respective ports (e.g., ingress ports 102, egress ports 104, etc.), centralized (e.g., in a buffer pool, for example), or distributed among multiple ports.

At 310, the process flow 300 may include placing a descriptor 122 (also referred to herein as a 'packet descriptor') corresponding to the packet 103 in a descriptor queue 134.

The packet switch 101 may support routing the packet 103 using a first mode (also referred to herein as a 'low latency mode'), which includes using a first data path (e.g., a low latency path described herein) included in the crossbar circuit 106. The packet switch 101 may further support routing the packet 103 using a second mode (also referred to herein as a 'non-low latency mode'), which includes using a second data path (e.g., a non-low latency path described herein) included in the crossbar circuit 106. Examples of routing the packet 103 according to the first mode and the second mode, and example criteria for routing the packet 103 according to the first and second modes, are described herein.

In some aspects, the segments are transferred according to the first mode or the second mode based on one or more criteria being satisfied. For example, at 312, the process flow 300 may include determining whether first criteria is satisfied. The first criteria may be associated with a congestion amount at the crossbar circuit 106, a processing load at the crossbar circuit 106, a state of a state machine 400 at the ingress port 102, a state of a state machine 401 at the egress port 104, and/or a buffer usage at a remote device (e.g., device 115-*b*).

In an example, at 312, the process flow 300 may include comparing the buffer usage at the buffer 107 of the crossbar circuit 106 to a threshold value. For example, the buffer usage may correspond to the amount of congestion at the crossbar circuit 106 (e.g., amount of data presently routed by the crossbar circuit 106). If the buffer usage at the crossbar circuit 106 is less than the threshold value (e.g., buffer usage<threshold value='Yes'), the process flow 300 may proceed to 315. In an alternative example, if the buffer usage at the crossbar circuit 106 exceeds the threshold value (e.g., buffer usage<threshold value='No'), the process flow 300 may proceed to 345.

In another example, at 312, the process flow 300 may include comparing a processing load experienced by the crossbar circuit 106 (e.g., due to scheduling operations, etc.) to a threshold value. For example, if the processing load at the crossbar circuit 106 is less than the threshold value (e.g., processing load<threshold value='Yes'), the process flow 300 may proceed to 315. In an alternative example, if the processing load exceeds the threshold value (e.g., processing load<threshold value='No'), the process flow 300 may proceed to 345. Accordingly, for example, aspects of the process flow 300 associated with 312 may prevent or mitigate increases in congestion and processing load on the crossbar circuit 106.

In some aspects, the crossbar circuit 106 can provide an indication (e.g., signal 111 ('Break TP')) to signal whether the crossbar circuit 106 is available or unavailable for routing packets via the low latency path and according to the first mode. In an example, based on the indication, the packet switch 101 may determine whether to transfer the segments to the egress port 104 via the first data path (low latency path) and the first mode, or via the second data path (non-low latency path) and the second mode.

Example aspects of the state machine of the ingress port 102 and the state machine of the egress port 104 are later described with reference to FIG. 4 (e.g., state machine 400, state machine 401). In some aspects, based on the state of the state machine 400 and/or the state of the state machine 401, receive logic 120 may determine whether to transfer the segments to the egress port 104 via the first data path (low latency path) and the first mode, or via the second data path (non-low latency path) and the second mode.

In another example, at 312, the process flow 300 may include comparing the buffer usage of a data buffer at a remote device (e.g., device 115-*b*) to a threshold value. For example, if the buffer usage is less than the threshold value (e.g., buffer usage<threshold value='Yes'), the process flow 300 may proceed to 315. In another example, if the buffer usage is greater than the threshold value (e.g., buffer usage<threshold value='No'), the process flow 300 may proceed to 345.

At 315, the packet switch 101 may transfer the segments of the packet 103 to egress port 104 via the first data path (e.g., a low latency path described herein) included in the crossbar circuit 106, according to the first mode of routing the packet 103. In some example aspects of the first mode, the crossbar circuit 106 may transfer the segments to the egress port 104 in an absence of reading the descriptor 122, and the crossbar circuit 106 may bypass the descriptor queue 134.

For example, the receive logic 120 may provide data 124 (including "Write Data" and "TP fanout") and data 125 (including a segment identifier (chunk ID) and a TP descriptor) to the crossbar circuit 106. The segments of the packet 103 may be included in the data 124. The crossbar circuit 106 may provide data 142 (including "TP Data" and the segment identifier ("chunk ID")) to the egress logic 145. The segments of the packet 103 may be included in the "TP Data."

At 320, the egress logic 145 may order the segments based on sequence numbers associated with the segments. For example, the egress logic 145 may reorder the segments and data included therein according to the sequence numbers (e.g., per resolution queue). The egress logic 145 may provide, or return, the sequence numbers of the reordered segments to the receive logic 120.

At 322, the receive logic 120 may verify whether the sequence numbers received from the egress logic 145 satisfy one or more criteria (e.g., second criteria). In an example, the receive logic 120 may compare the sequence numbers provided by the egress logic 145 to the initial sequence numbers associated with the segments initially provided by the receive logic 120. The receive logic 120 may determine that the one or more criteria is satisfied (e.g., 'Second Criteria Satisfied'='Yes'), and accordingly, that the transfer of the segments via the low latency path is successful, if based on the comparison, the sequence numbers provided by the egress logic 145 match the initial sequence numbers (e.g., no sequence numbers are missing, the sequence order of the sequence numbers provided by the egress logic 145 is the same as the sequence order of the initial sequence numbers, etc.).

At 325 of the process flow 300, the receive logic 120 may validate the transfer of the segments according to the first mode. For example, in response to determining at 322 that the one or more criteria is satisfied (e.g., 'Second Criteria Satisfied'='Yes'), the receive logic 120 validates the transfer of segments.

At 330, the process flow 300 may include deleting the data 105 from the buffer (e.g., the packet buffer implemented at cache 121) in response to the validation of the transfer of the segments according to the first mode.

At 335, the process flow 300 may include removing the descriptor 122 from the descriptor queue 134 in response to validating the transferring of the segments in association with the first mode.

In an example alternative to 325, at 340 of the process flow 300 at 340, the receive logic 120 may invalidate the transfer of the segments according to the first mode. For example, in response to determining at 322 that the one or more criteria is not satisfied (e.g., 'Second Criteria Satisfied'='No'), the receive logic 120 invalidates the transfer of segments.

At 345, the process flow 300 may include transferring the segments to the egress logic 145, and accordingly, the egress port 104 via a second data path (e.g., non-low latency path) included in the crossbar circuit 106, according to a second mode of routing the packet 103. For example, for transferring the segments according to the second mode, the egress logic 145 may read the descriptor 122 from the descriptor queue 134.

In some aspects, the segments are transferred according to the second mode by reading the descriptor 122 based on a queue position of the descriptor 122 in the descriptor queue 134. In an example, the egress logic 145 reads descriptors from the descriptor queue 134 in turn, and in response to reading the descriptor 122, the egress logic 145 may request for the copy of the packet 103 as stored in the buffer (e.g., packet buffer as implemented at cache 121) to be transferred to the egress logic 145 via the non-low latency path.

Figure 4:
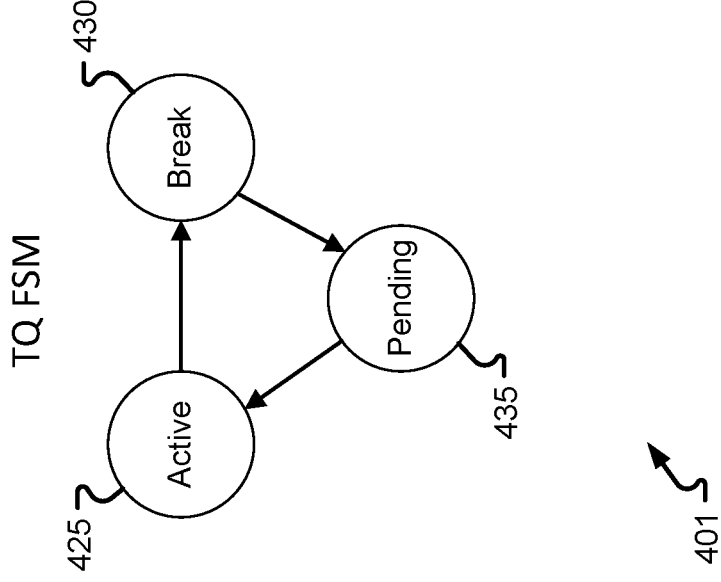
FIG. 4 illustrates examples of state machines in accordance with aspects of the present disclosure.
Figure 4:
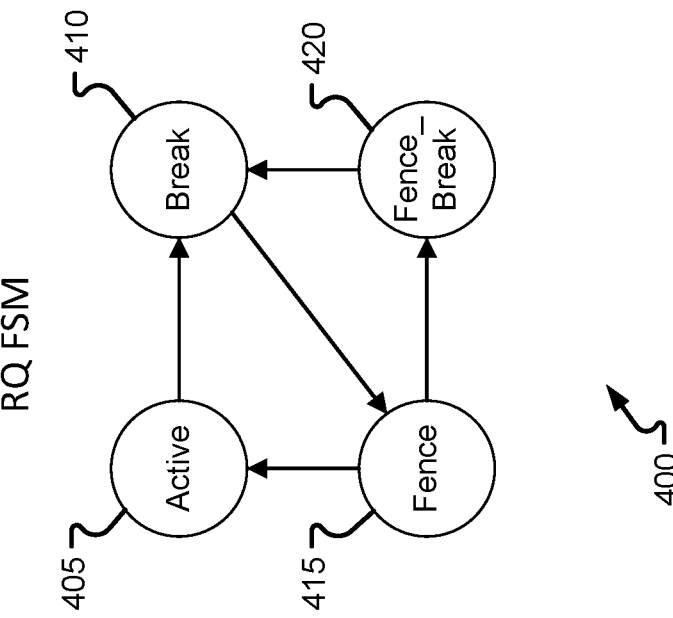

FIG. 4 illustrates an example of a state machine 400 associated with the receive logic 120 and a resolution queue (RQ) of the packet switch 101, in accordance with aspects of the present disclosure. FIG. 4 further illustrates an example of a state machine 401 associated with the egress logic 145 and a data transmission queue (TQ) of the packet switch 101, in accordance with aspects of the present disclosure.

In some examples, the state machine 400 may be referred to as a RQ FSM, and the state machine 401 may be referred to as an TQ FSM. Example aspects described with reference to the RQ may be implemented by the receive logic 120. Example aspects described with reference to the TQ may be implemented by the egress logic 145.

Example aspects of the state machine 400 and the receive logic 120 are described herein. If the state machine 400 is not active, no packets 103 are transferred via the low latency path (Turbo Path (TP)), and any packet 103 that increases a counter will go through break state 410. In some aspects, the state machine 400 entering the break state 410 may cause a break state 430 at the state machine 401 because, during the break state 430 at the state machine 401, there are packets in regular flow (e.g., transfer via a non-low latency path and the second mode described herein) that should clear before a new TP session (e.g., transfer of packets 103 via the low latency path and the first mode) can begin.

In some aspects, the packet switch 101 may implement a timer to prevent jitter associated with transferring packets 103 via the low latency path. For example, the state machine 400 may return to the active state 405 from the break state 410, after expiry of the timer.

In the active state 405, packets can be sent via the low latency path, from the point of view of the RQ. Transitioning from the active state 405 to the break state 410 (active2break), packets 103 may be sent on the non-low latency path (regular path) or TQ break.

In an example of the break state 410, the RQ sent a packet 103 via the non-low latency path (regular path), and the receive logic 120 waits until counters go to 0, meaning all packets 103 have been scheduled and that packet transfer via the low latency path is presently disabled (e.g., the RQ is now in BTA). Once the counters are at 0, the state machine 400 may transition from the break state 410 to the fence state 415 (break2fence) and send a fence request to the TQ.

In the fence state 415, the state machine 400 may send a fence request to the TQ and wait for the fence to be established. In an example of transitioning from the fence state 415 to the active state 405 (fence2active), the state machine 400 may transition to the active state 405 in response to an indication (fence_done) from the TQ that the fence has been established. In an example of transitioning from the fence state 415 to the fence_break state 420 (fence2fence_break), a packet may be sent via the non-low latency path (regular path).

In the fence_break state 420, the receive logic 120 may wait for a fence to be established after a break happens during fence, and the state machine 400 transitions to break state 410. In an example of transitioning from the fence_break state 420 to the break state 410 (fence_break2break), the receive logic 120 may receive an indication (fence_done) from the TQ.

Example aspects of the state machine 401 and the egress logic 145 are described herein. The active state 425 of the TQ can be broken by TQ. In some aspects, the state machine 401 will not return to the active state 425 from the break state 430 (e.g., will not raise) until receiving an indication from the receive logic 120 that the RQ is empty. In some aspects, the state machine 401 entering the break state 425 may cause the state machine 400 to enter the break state 410 (e.g., TQ break also breaks RQ FSM).

In the active state 425, packets can be sent via the low latency path, from the point of view of the TQ. The state machine 401 transitioning from the active state 425 to the break state 430 (active2break, break RQ FSM) may be in response to the signal 137 received from the TQ in which 'tp_en=0'.

In an example of the break state 430, the TQ is broken, and the RQ waits until all IDs are returned from the TQ. For example, the TQ waits for counters (also referred to herein as 'IDS counters') associated with RQ turbo state management to go to 0, and the packet switch 101 implements a TQ fence so that the packet switch 101 may transfer, via the non-low latency path, the packets that were dropped due to the attempted transfer via the low latency path.

In an example of transitioning from the break state 430 to the pending state 435, all IDs are returned from the TQ, and the counters associated with RQ turbo state management are 0. PTT sends an indication 'fence done' within the egress logic 145 to TQ.

In the pending state 435, the state machine 401 may wait until the TQ acknowledges the return of the IDs. In an example of the state machine 400 transitioning from the fence state 415 to the active state 405, the receive logic 120 receives a signal 137 in which 'tp_en=1'. That is, for example, TQ raises tp_en from a value of "0" to "1", and based on the value of "1", RQ identifies that TQ is ready to perform the low latency flow.

The example aspects of the packet switch 101 described herein provide reduced latency associated with pinging an Infiniband address (e.g., lowest latency for ping IB). Aspects of the features and process flows described herein support the immediate transfer of packets (TP packets) using the low latency path to the TQ through the crossbar circuit 106 (e.g., immediate transmission of a TP packet to the TQ through TCB). Such immediate transfer of packets provides technical improvements of minimal latency using existing resources of a crossbar circuit 106. For example, the techniques described herein provide reduced latency without changing existing infrastructures of the crossbar circuit 106. That is, the techniques described herein support reduced latency without adding a dedicated TP crossbar circuit, thereby mitigating increases in cost/area associated with implementing use of the low latency path.

Additional aspects of the packet switch 101 support random traffic, aspects of which are later described herein. Some additional aspects of the packet switch 101 support maintaining a wire speed as high as possible. For example, the features of the packet switch 101 as described herein may support full wire speed (e.g., line rate) on a point-to-point connection between a device 115 and another device 115, and random traffic is reduced.

An example TP flow (turbo path flow, low latency path flow) supported by the packet switch 101 for transferring packets via a low latency path (TP path) and according to a low latency path mode (turbo path mode, TP mode) in accordance with aspects of the present disclosure is described herein.

The TP flow may begin at FTO logic (e.g., cache 121 with forwarding data) of the packet switch 101 with a cache hit. The FTO logic may be implemented at forwarding tables 131 and/or flow control manager 130 of the packet switch 101 illustrated in FIG. 2. For a unicast (UC) packet (e.g., a packet 103) with a cache hit, the FTO logic may send the packet to the TP path.

The FTO logic marks a descriptor 122 associated with the packet as eligible for TP and sends the descriptor 122 towards the receive logic 120. In some cases, the receive logic 120 may also be referred to herein as 'IDS.' The receive logic 120 is responsible for the RQ side of the flow. The receive logic 120 has a state per TQ that indicates if the RQ→TQ path is eligible for TP. Accordingly, for example, at the cache 121, the descriptor 122 is marked to indicate the packet as eligible for low latency path, and the descriptor 122 is sent towards buffer control.

If the packet is eligible for TP, the receive logic 120 forwards addresses to BTA and marks the packet as TP. In some aspects, a responsibility of the receive logic 120 is to write the packet into the buffer 107 of the crossbar circuit 106 and to try and initiate low latency flow/TP flow.

In some aspects, the TP packet in BTA is written to the buffer 107 as regular flow (e.g., as a fallback), because the packet switch 101 has not confirmed at this point whether TQ will be able to transmit the packet.

The TP packet is transferred via ALM channels towards the TQ (e.g., towards PTT). In an example, a motivation for using the ALM channels is achieving lowest possible latency by separating TP traffic from regular traffic. For example, ALM channels support reductions, similar to SHArP channels. PTT is the component or circuitry that supports the TQ side of the TP path. In an example, the PTT has reorder buffers (ROBs) per multi RQ support. By using ALM channels, the techniques described herein may eliminate the chance of collision between TP traffic and regular traffic. For example, each collision may increase latency and may potentially break TP.

Another use of ALM channels is scalable hierarchical aggregation protocol (SHArP) traffic. For example, when SHARP traffic is active, TP may be expected to break because of backpressure from receive buffer (RB) FIFOs at the TQ and may be expected to clear the way for the SHArP traffic.

If packet transfer to TQ has started, the packet has to arrive at TQ completely. Accordingly, for example, receive logic 120 also verifies the TQ has buffer credits (MTU credits) in send buffer (SB) FIFOs before receive logic 120 sends a TP packet.

The egress logic 145 may include a PTT component (not illustrated) (also referred to herein as 'PTT' or a 'PTT manager'). PTT is the component in TQ that supports or manages TP handling. PTT includes a reorder buffer (ROB) for non-TP packets, and PTT includes a TP reorder buffer (TP ROB) for TP packets. In an example, the ROB and the TP ROB may be implemented at cache 146 of the egress logic 145. In some aspects, since EDS is absent at the egress logic 145, PTT is responsible for allocating ROB addresses, in order to allow for the receive logic 120 to send an ID (e.g., a sequence ID) per 8B chunk of data in a TP packet.

In an example, after PTT sends a TP packet to the egress port 104 (e.g., an egress packet modifier (also referred to herein as DCM) at the egress port 104), the IDs are returned to the receive logic 120 through PTA 135, for example, via signal 136 ('ID release per TQ').

In some aspects, PTT writes the data to the TP ROB according to allocated address, which maintains the ordering of the data (e.g., data segments, data chunks) in the packet.

When the start of a packet arrives, the start can be transferred. For example, PTT includes an arbiter component between the ROB and the TP ROB, and the arbiter component may manage any regular packets that may arrive. Accordingly, for example, the arbiter component may support maintaining data/packet ordering with regular flow (e.g., using non-low latency path and the second mode of routing packets) and ensuring that data/packets transferred via TP will always be in the right order (e.g., initial sequence order).

In some aspects, PTT may transmit a TP packet in response to receiving an indication (e.g., a TP enable signal per virtual lane) from a quality of service manager (also referred to herein as 'DQS') of the packet switch 101. The indication may include values corresponding to one or more flow control parameters (e.g., IB credits, shapers, queues, etc.).

The DQS is responsible for flow control in TP and discards regular path copies of TP packets. The DQS may calculate buffer credits (IB credits) and monitor the quantity of buffer credits in comparison to a threshold (e.g., 4 buffer credits) for TP. In some examples, the DQS may be implemented at the flow control manager 130. The DQS may send a TP enable signal to PTT for DQS related TP breaks.

As a TP packet is transmitted from the egress logic 145 and the egress port 104, the PTT may provide a notification (e.g., using a signal 147 ('TP ACK per chunk for credits') to DQS per chunk to allow consumption of IB credits. The TP ACK in the notification allows discard of the copy (regular copy, non-low latency path copy for transfer according to the second mode) of the packet from the regular path.

For example, the regular copy of the descriptor 122 is maintained at DQS. DQS will not transmit the descriptor 122 until the TP ACK is received. After TP ACK, DQS will schedule the regular copy as TP discard. In some aspects, the TP discard is a type of discard that deletes all data associated with the regular copy, without sending anything to DCM. For example, the TP discard deletes both the copy of the packet and the descriptor 122 associated with the packet. Aspects of the present disclosure include preventing the start of a new TP session after TP break until one or more criteria is satisfied (e.g., until the path between RQ and TQ is clear of packets).

In some aspects, receive logic 120 verifies whether ordering (e.g., packet ordering, segment ordering, data ordering) is broken by maintaining cache_hit counters per TQ and one global cache_hit counter. Accordingly, for example, by using cache_hit counter per TQ and global cache_hit counter RQ, the receive logic 120 may validate the successful transfer of a packet 103 (and data or segments thereof) via TP. That is, for example, by using cache_hit counter per TQ and global cache_hit counter RQ, the receive logic 120 can be sure that there are no packets currently in route towards a specific TQ and assure no ordering violations.

The cache_hit counter holds all the packets towards a specific TQ. The receive logic 120 is aware of the TQ ID from cache 121. The cache_hit holds packets that might go to a TQ. As the cache_hit is known at an FDB implemented at the flow control manager 130, using a global cache_miss supports implementations herein which refrain from adding an interface from FDB for precise counting but complex implementations.

A cache_hit breaks all TQs because the packet switch 101 is unaware of which TQ the cache_hit will use. Aspects of the present disclosure support operations on an assumption that in cases that TP should be active, a very small amount (if any) of cache hits may be present in the packet switch 101. Accordingly, for example, use of the counters described herein (e.g., cache_hit, cache_miss, etc.) by the packet switch 101 may support returning to a TP flow (e.g., transfer of packets 103 (and data or segments thereof) via TP) after a TP break.

IDS counter increases are associated with IDS scheduling, and decreases come from BTA when a packet end is read. Aspects of the present disclosure support breaking TP on the RQ side (e.g., based on backpressure from BTA) or on the TQ side (e.g., not enough buffer space in the TP ROB).

In an example case of TP break, before returning to TP, the packet switch 101 may confirm that all packets from the previous TP flow, and also all regular flow packets that were sent during the TP break, are out of PTT. The packet switch 101 may use a combination of counters (IDS counters) described herein in combination with a TQ fencing flow and an RQ emptying flow. For example, the IDS counters do not provide assurance of whether data that was read exited BTA, but the IDS counters do provide an indication that a read (e.g., signal 133 ('read request')) was issued and the data is now progressing towards ROB through crossbar circuit 106 (e.g., tiled crossbar).

Example aspects of the TQ fencing flow and the RQ emptying flow are described herein.

1. TQ Fence: The TQ fence is a fence on ROB that makes sure all scheduled addresses are out. The TQ fence is used for regular packets. A case in which IDS counters are 0 means that all the data is in BTA moving to ROB, and ROB already has the address allocated. The TQ fencing flow includes placing a fence on ROB addresses and verifying that all regular packets (e.g., packets transferred via the non-low latency path) related to a TP session are definitely out of BTA.

2. RQ Empty: In an example of the RQ empty flow, the RQ will wait until all IDs are returned. The case in which all IDs are returned means that all TP data from the current session is out of BTA.

The packet switch 101 may support random traffic. For example, the packet switch 101 may support collisions of multiple RQs trying to send packets to a TQ at the same time. In an example, the packet switch 101 may include multiple TP ROBs, one per current RQ. In some aspects, the packet switch 101 implements multiple ROBs because each RQ has unique treatment due to address allocation with BTA out of order.

The number of TP ROBs is equal to the number of RQs that can arrive simultaneously and not break TP. Aspects of the present disclosure include defining the number of RQs (and accordingly, the number of TP ROBs) by comparing costs of a TP ROB, collision statistics, and TP return time after a TP break. For example, implementations including 144 TP ROBs may ensure that TP will never break. However, such a quantity of TP ROBs has a high implementation cost. Accordingly, for example, given a quantity of ports of the packet switch 101, the packet switch 101 includes a quantity of TP ROBs that supports a target bandwidth without breaking under random traffic with the given amount of ports.

Figure 5:
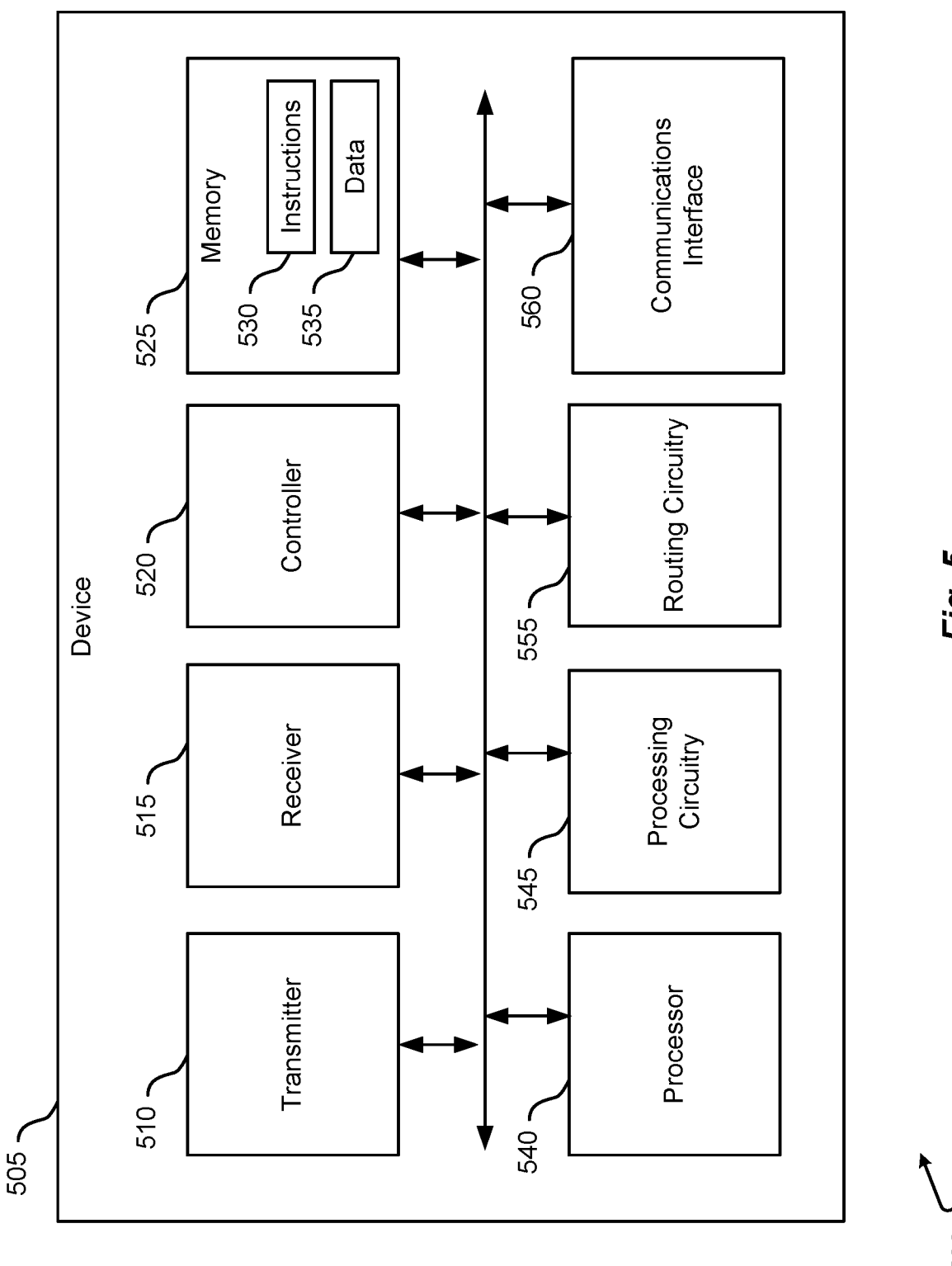
FIG. 5 illustrates an example of a system in accordance with aspects of the present disclosure.

FIG. 5 illustrates an example of a system 500 in accordance with aspects of the present disclosure. The system 500 may include a device 505. In some cases, the device 505 may be referred to as a computing resource. The device 505 may perform any or all of the operations described in the present disclosure. The device 505 may implement aspects of a packet switch 101 described herein.

The device 505 may include a transmitter 510, a receiver 515, a controller 520, a memory 525, a processor 540, processing circuitry 545, routing circuitry 555, and a communications interface 560. In some examples, components of the device 505 (e.g., transmitter 510, receiver 515, controller 520, memory 525, processor 540, processing circuitry 545, routing circuitry 555, communications interface 560, etc.) may communicate over a system bus (e.g., control busses, address busses, data busses, etc.) included in the device 505. It is to be understood that aspects of the present disclosure may support omitting any of the components of the device 505, including additional instances of the components of the device 505, or including additional components not illustrated in FIG. 5. For example, in the case of a packet switch (e.g., packet switch 101), one or more functions of the device 505 may be implemented by processing circuitry 545 and routing circuitry 555, without processor 540.

The transmitter 510 and the receiver 515 may support the transmission and reception of signals to and from the device 505. In some aspects, the transmitter 510 and the receiver 515 may support the transmission and reception of signals within the device 505. The transmitter 510 and receiver 515 may be collectively referred to as a transceiver. An antenna may be electrically coupled to the transceiver. The device 505 may also include (not shown) multiple transmitters 510, multiple receivers 515, multiple transceivers and/or multiple antennas.

The controller 520 may be located on a same chip (e.g., ASIC chip) as the transmitter 510 and/or the receiver 515. In some cases, the controller 520 may be located on a different chip as the transmitter 510 and/or the receiver 515. In some examples, the controller 520 may be located on a chip of or on a chip of another device 505. In some examples, the controller 520 may be a programmed microprocessor or microcontroller. In some aspects, the controller 520 may include one or more CPUs, memory, and programmable I/O peripherals. The controller 520 may control the routing circuitry 555 to route data according to the techniques described herein.

The memory 525 may be any electronic component capable of storing electronic information. The memory 525 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 525 may include instructions 530 (computer readable code) and data 535 stored thereon. The instructions 530 may be executable by the processor 540 to implement the methods disclosed herein. In some aspects, execution of the instructions 530 may involve one or more portions of the data 550. In some examples, when the processor 540 executes the instructions 530, various portions of the instructions 530 and/or the data 535 may be loaded onto the processor 540.

The processor 540 may correspond to one or multiple computer processing devices. For example, the processor 540 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 525 of the device 505). For example, upon executing the instruction sets stored in memory 525, the processor 540 may enable or perform one or more functions of the device 505. In some examples, a combination of processors 540 (e.g., an advanced reduced instruction set computer (RISC) machine (ARM) and a digital signal processor (DSP)) may be implemented in the device 505.

The processing circuitry 545 may enable or perform one or more functions of the device 505. For example, the processing circuitry 545 may implement aspects of a packet switch (e.g., packet switch 101) and components thereof (e.g., processing circuitry 109, etc.) described herein.

The routing circuitry 555 may implement aspects of a packet switch (e.g., packet switch 101) and crossbar circuit (e.g., crossbar circuit 106) described herein.

The communications interface 560 may support interactions (e.g., via a physical or virtual interface) between a user and the device 505.

FIG. 6 illustrates an example of a process flow 600 in accordance with aspects of the present disclosure. In some examples, aspects of the process flow 600 may be implemented by a packet switch 101 and/or a device 505 described herein. For example, aspects of the process flow 600 may be implemented by processing circuitry 109 or processing circuitry 545 described herein.

In the following description of the process flow 600, the operations may be performed in a different order than the order shown, or the operations may be performed in different orders or at different times. Certain operations may also be left out of the process flow 600, or other operations may be added to the process flow 600.

It is to be understood that while a packet switch 101 is described as performing a number of the operations of process flow 600, the operations shown are not limited to the packet switch 101 and may be performed by another device (e.g., device 505).

Aspects of the process flow 600 may be implemented by an apparatus including processing circuitry to implement aspects of the process flow 600.

At 605, the process flow 600 may include storing data from a packet to a buffer.

At 610, the process flow 600 may include placing a descriptor corresponding to the packet in a descriptor queue.

At 615, the process flow 600 may include transferring, from an ingress port, a plurality of segments associated with the packet to an egress port via a data path included in the apparatus, wherein transferring the plurality of segments is performed according to a first mode of routing the packet in an absence of reading the descriptor corresponding to the packet.

In some aspects, the apparatus may include a crossbar circuit that includes the data path. In an example, the plurality of segments are transferred according to the first mode in response to receiving an indication of a congestion state of the crossbar circuit.

In some aspects, the apparatus may include one or more state machines. In an example, the plurality of segments are transferred according to the first mode based on a state provided by the one or more state machines.

In some aspects, the process flow 600 may include determining a buffer usage of a data buffer, and the plurality of segments are transferred according to the first mode based on a result of comparing the buffer usage to a threshold buffer usage value.

In some aspects, the plurality of segments are transferred to the egress port according to the first mode by bypassing the descriptor queue.

At 620, the process flow 600 may include ordering, at the egress port, the plurality of segments based on sequence numbers associated with the plurality of segments.

At 625, the process flow 600 may include validating the transfer of the plurality of segments according to the first mode based on verifying that the sequence numbers satisfy at least one criterion.

At 630, the process flow 600 may include deleting the data from the buffer in response to validating the transfer of the plurality of segments in association with the first mode.

At 635, the process flow 600 may include removing the descriptor from the descriptor queue in response to validating the transfer of the plurality of segments in association with the first mode.

In another example, at 640, the process flow 600 may include invalidating the transfer of the plurality of segments according to the first mode based on determining that the sequence numbers fail to satisfy the at least one criterion.

At 645, the process flow 600 may include transferring the plurality of segments to the egress port via a second data path included in the apparatus, according to a second mode of routing the packet. In an example, the plurality of segments are transferred according to the second mode based on reading the descriptor from the descriptor queue.

In some aspects, the plurality of segments are transferred according to the second mode by reading the descriptor based on a queue position of the descriptor in the descriptor queue.

In some aspects, the process flow 600 may include transferring the plurality of segments to the egress port according to the second mode of routing the packet in response to: a failure associated with the transfer of the plurality of segments to the egress port according to the first mode; and confirmation of at least one second criterion. In an example, the at least one second criterion includes: a return of the sequence numbers to the ingress port; a target packet count associated with the egress port; or both.

FIG. 7 illustrates an example of a process flow 700 in accordance with aspects of the present disclosure. In some examples, aspects of the process flow 700 may be implemented by a packet switch 101 and/or a device 505 described herein. For example, aspects of the process flow 700 may be implemented by processing circuitry 109 or processing circuitry 545 described herein.

In the following description of the process flow 700, the operations may be performed in a different order than the order shown, or the operations may be performed in different orders or at different times. Certain operations may also be left out of the process flow 700, or other operations may be added to the process flow 700.

It is to be understood that while a packet switch 101 is described as performing a number of the operations of process flow 700, the operations shown are not limited to the packet switch 101 and may be performed by another device (e.g., device 505).

Aspects of the process flow 700 may be implemented by a switching device including: a plurality of ingress ports; a plurality of egress ports; one or more switching circuits that connect the plurality of ingress ports with the plurality of egress ports; and processing circuitry. The processing circuitry may implement aspects of the process flow 700.

At 703, the process flow 700 may include segmenting, using first port logic associated with an ingress port of the plurality of ingress ports, data included in a packet received at the ingress port into a plurality of segments.

At 705, the process flow 700 may include storing the data from the packet to a buffer.

At 710, the process flow 700 may include placing a descriptor corresponding to the packet in a descriptor queue.

At 715, the process flow 700 may include transferring the plurality of segments to an egress port of the plurality of egress ports via a data path included in the one or more switching circuits, wherein transferring the plurality of segments is performed according to a first mode of routing the packet in an absence of reading the descriptor corresponding to the packet.

In some aspects, the plurality of segments are transferred according to the first mode in response to an indication of a congestion state of the one or more switching circuits.

In some aspects, the switching device may include: one or more first state machines associated with the ingress port; and one or more second state machines associated with the egress port. In an example, the plurality of segments are transferred according to the first mode based on a state provided by the one or more first state machines, a state provided by the one or more second state machines, or both.

At 720, the process flow 700 may include ordering, using second port logic associated with the egress port, the plurality of segments based on sequence numbers associated with the plurality of segments and provide the sequence numbers to the first port logic.

At 725, the process flow 700 may include validating, using the first port logic, the transfer of the plurality of segments according to the first mode. In an example, validating the transfer of the plurality of segments according to the first mode is based on the first port logic verifying that the sequence numbers satisfy at least one criterion.

At 730, the process flow 700 may include deleting the data from the buffer in response to the validation of the transfer of the plurality of segments according to the first mode.

At 735, the process flow 700 may include removing the descriptor from the descriptor queue in response to validating the transferring of the plurality of segments in association with the first mode.

In another example, at 740, the process flow 700 may include invalidating, using the first port logic, the transfer of the plurality of segments according to the first mode based on determining that the sequence numbers fail to satisfy the at least one criterion.

At 745, the process flow 700 may include transferring the plurality of segments to the egress port via a second data path included in the one or more switching circuits, according to a second mode of routing the packet. In some aspects, the plurality of segments are transferred according to the second mode based on reading the descriptor from the descriptor queue.

FIG. 8 illustrates an example of a process flow 800 in accordance with aspects of the present disclosure. In some examples, process flow 800 may implement aspects of a packet switch 101 and/or a device 505 described herein. For example, aspects of the process flow 800 may be implemented by processing circuitry 109 or processing circuitry 545 described herein.

In the following description of the process flow 800, the operations may be performed in a different order than the order shown, or the operations may be performed in different orders or at different times. Certain operations may also be left out of the process flow 800, or other operations may be added to the process flow 800.

It is to be understood that while a packet switch 101 is described as performing a number of the operations of process flow 800, the operations shown are not limited to the packet switch 101 and may be performed by another device (e.g., device 505).

Aspects of the process flow 800 may be implemented by an apparatus including processing circuitry to implement aspects of the process flow 800.

At 805, the process flow 800 may include storing data from a packet to a buffer.

At 810, the process flow 800 may include placing a descriptor corresponding to the packet in a descriptor queue.

At 815, the process flow 800 may include transferring, from an ingress port, a plurality of segments associated with the packet to an egress port via one or more crossbar circuits included in the apparatus, wherein transferring the plurality of segments is performed according to a first mode of routing the packet in an absence of reading the descriptor corresponding to the packet.

In some aspects, the plurality of segments are transferred to the egress port according to the first mode by bypassing a descriptor queue.

At 820, the process flow 800 may include ordering, at the egress port, the plurality of segments based on sequence numbers associated with the plurality of segments.

At 825, the process flow 800 may include validating the transfer of the plurality of segments according to the first mode based on verifying that the sequence numbers satisfy at least one criterion.

At 830, the process flow 800 may include, in response to validating the transfer of the plurality of segments in association with the first mode, at least one of: deleting the data from the buffer; and removing the descriptor from the descriptor queue.

In another example, at 835, the process flow 800 may include invalidating the transfer of the plurality of segments according to the first mode based on determining that the sequence numbers fail to satisfy the at least one criterion.

At 840, the process flow 800 may include transferring the plurality of segments to the egress port via the one or more crossbar circuits according to a second mode of routing the packet. In an example, the plurality of segments are transferred according to the second mode based on reading the descriptor from the descriptor queue.

Any of the steps, functions, and operations discussed herein can be performed continuously and automatically.

The exemplary apparatuses, systems, and methods of this disclosure have been described in relation to examples of packet switch 101 and a device 505. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

Other variations are within spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An apparatus comprising:

a first data path; and first logic associated with an ingress port and to:

in response to determining that a packet received by the ingress port is eligible for transfer from the ingress port to an egress port via the first data path, copy the packet and store the copied packet in a buffer;

segment the packet into a plurality of segments, each segment having an associated sequence number;

transfer, via the ingress port, the plurality of segments of the packet to the egress port via the first data path;

receive, from the egress port, an indication of which sequence numbers were received by the egress port;

validate transfer of the packet from the ingress port to the egress port via the first data path when the sequence numbers received from the egress port match the sequence numbers sent by the ingress port; and in response to the validation, delete the copied packet from the buffer.

2. The apparatus of claim 1, wherein the first data path is a low latency data path.

3. The apparatus of claim 1, wherein the first logic is to further:

place a descriptor corresponding to the packet in a descriptor queue; and remove the descriptor from the descriptor queue in response to validating the transfer of the packet.

4. The apparatus of claim 1, wherein the plurality of segments are transferred to the egress port by bypassing a descriptor queue.

5. The apparatus of claim 1, further comprising:

a second data path, wherein the first logic is to further:

invalidate the transfer of the packet from the ingress port to the egress port when the sequence numbers at the egress port do not match the sequence numbers sent by the ingress port; and transfer the plurality of segments to the egress port via the second data path.

6. The apparatus of claim 5, wherein the plurality of segments are transferred via the second data path by reading a descriptor of the packet.

7. The apparatus of claim 1, further comprising:

a crossbar circuit that comprises the first data path, wherein the plurality of segments are transferred via the first data path in response to receiving an indication of a congestion state of the crossbar circuit.

8. The apparatus of claim 1, further comprising:

at least one state machine, wherein the plurality of segments are transferred via the first data path based on a state provided by the at least one state machine.

9. The apparatus of claim 1, wherein the first logic is to further:

determine a buffer usage of a data buffer, wherein the plurality of segments are transferred via the first data path based on a result of comparing the buffer usage to a threshold buffer usage value.

10. The apparatus of claim 1, wherein the first logic is to transfer the plurality of segments to the egress port via a second data path in response to:

a failure associated with the transfer of the plurality of segments to the egress port via the first data path; and confirmation of at least one of:

a return of the sequence numbers to the ingress port;

a target packet count associated with the egress port; or both.

11. A switching device comprising:

a plurality of ingress ports;

a plurality of egress ports;

at least one switching circuit that connects the plurality of ingress ports with the plurality of egress ports, the at least one switching circuit comprising a first data path; and first logic associated with an ingress port of the plurality of ingress ports and to:

in response determining that a packet received by the ingress port is eligible for transfer from the ingress port to an egress port of the plurality of egress ports via the first data path, copy the packet and store the copied packet in a buffer;

segment the packet received at the ingress port into a plurality of segments;

transfer, via the ingress port, the plurality of segments to the egress port via the first data path;

receive, from the egress port, an indication of which sequence numbers were received by the egress port;

validate transfer of the packet from the ingress port to the egress port via the first data path when the sequence numbers received from the egress port match the sequence numbers sent by the ingress port; and in response to the validation, delete the copied packet from the buffer.

12. The switching device of claim 11, wherein the first data path is a low latency data path.

13. The switching device of claim 11, wherein the first logic is to further:

place a descriptor corresponding to the packet in a descriptor queue; and remove the descriptor from the descriptor queue in response to validating the transfer of the packet.

14. The switching device of claim 11, wherein the first logic is to further:

invalidate the transfer of the packet from the ingress port to the egress port when the sequence numbers at the egress port do not match the sequence numbers sent by the ingress port; and transfer the plurality of segments to the egress port via a second data path comprised in the at least one switching circuit.

15. The switching device of claim 11, wherein the plurality of segments are transferred via the first data path in response to an indication of a congestion state of the at least one switching circuit.

16. The switching device of claim 11, further comprising:

at least one first state machine associated with the ingress port; and at least one second state machine associated with the egress port;

wherein the plurality of segments are transferred via the first data path based on a state provided by the at least one first state machine, a state provided by the at least one second state machine, or both.

17. An apparatus comprising:

at least one crossbar circuit comprising a low latency data path; and first logic associated with an ingress port and to:

in response determining that a packet received by the ingress port is eligible for transfer from the ingress port to an egress port via the low latency data path, copy the packet and store the copied packet in a buffer;

transfer, from the ingress port, a plurality of segments of the packet to the egress port via the low latency data path;

receive, from the egress port, an indication of which sequence numbers were received by the egress port;

validate transfer of the packet from the ingress port to the egress port via the low latency data path when the sequence numbers received from the egress port match the sequence numbers sent by the ingress port; and in response to the validation, delete the copied packet from the buffer.

18. The apparatus of claim 17, wherein the first logic is to further:

place a descriptor corresponding to the packet in a descriptor queue; and in response to validating the transfer of the packet, remove the descriptor from the descriptor queue.

19. The apparatus of claim 17, wherein the plurality of segments are transferred to the egress port by bypassing a descriptor queue.

20. The apparatus of claim 17, wherein the first logic is to further:

invalidate the transfer of the packet from the ingress port to the egress port when the sequence numbers at the egress port do not match the sequence numbers sent by the ingress port; and transfer the plurality of segments to the egress port via a data path, different than the low latency data path, within the at least one crossbar circuit.

\* \* \* \* \*